United States Patent
De Miranda et al.

(10) Patent No.: US 9,281,525 B2
(45) Date of Patent: Mar. 8, 2016

(54) METHOD FOR THE PRODUCTION OF LIGHT HYDROCARBONS FROM GAS WITH HIGH METHANE CONTENT, A SOLID OXIDE FUEL CELL USED FOR THE PRODUCTION OF LIGHT HYDROCARBONS FROM GAS WITH HIGH METHANE CONTENT, AND A CATALYST FOR THE PRODUCTION OF LIGHT HYDROCARBONS FROM GAS WITH HIGH METHANE CONTENT

(75) Inventors: Paulo Emilio Valadão De Miranda, Rio de Janeiro (BR); Luis Guilherme Desá, São Paulo (BR); Taísa Eva Fuziger Gutierres, Rio de Janeiro (BR); Selma Aparecida Venâncio, Rio de Janeiro (BR); Isabela Caldeira Leite Leocádio, Rio de Janeiro (BR); Maria Auxiliadora Scaramelo Baldanza, Rio de Janeiro (BR); Martin Schmal, Rio de Janeiro (BR); Valéria Perfeito Vicentini, São Paulo (BR)

(73) Assignees: OXITENO S.A. INDUSTRIA E COMERCIO, Sao Paulo (BR); INSTITUTO ALBERTO LUIZ COIMBRA DE POSGRADUACAO E PESQUISA DE ENGENHARIA-COPPE/UFRJ, Rio de Janeiro (BR)

( * ) Notice: Subject to any disclaimer, the term of this patent is extended or adjusted under 35 U.S.C. 154(b) by 660 days.

(21) Appl. No.: 13/002,225
(22) PCT Filed: Jun. 29, 2009
(86) PCT No.: PCT/BR2009/000191
§ 371 (c)(1), (2), (4) Date: Apr. 21, 2011
(87) PCT Pub. No.: WO2010/000049
PCT Pub. Date: Jan. 7, 2010

(65) Prior Publication Data
US 2011/0189559 A1    Aug. 4, 2011

(30) Foreign Application Priority Data
Jul. 3, 2008   (BR) ..................... 0803895

(51) Int. Cl.
H01M 4/90 (2006.01)
H01M 8/06 (2006.01)
(Continued)

(52) U.S. Cl.
CPC ............... *H01M 4/9016* (2013.01); *C25B 5/00* (2013.01); *H01M 4/9033* (2013.01);
(Continued)

(58) Field of Classification Search
CPC ............ H01M 4/9016; H01M 4/9033; H01M 8/1253; C25B 5/00
USPC .................................................. 429/416, 489
See application file for complete search history.

(56) References Cited

U.S. PATENT DOCUMENTS

2002/0035035 A1* 3/2002 Kirchnerova et al. ........ 502/324
2005/0187099 A1* 8/2005 Matsuo et al. ................ 502/302

FOREIGN PATENT DOCUMENTS

CA            2186786 A1     4/1998

OTHER PUBLICATIONS

Tagawa et al., Mechanistic Aspects of Oxidative Coupling of Methane over LaAlO3, 1988, Journal of the Chemical Society, Faraday Transactions, 84, 923-929.*
(Continued)

*Primary Examiner* — Sean P Cullen
(74) *Attorney, Agent, or Firm* — Birch, Stewart, Kolasch & Birch, LLP

(57) ABSTRACT

The present invention refers to the conversion of gaseous or gasifiable fuels with high methane content, such as natural gas, biogas, synthesis gas or gas originated from various industrial process rejects, with or without prior desulfurization and elimination of other contaminants, in a solid oxide fuel cell (SOFC), with special anodes, based on mixed oxides or metal oxides with a perovskite type structure, either or not nano structured, into light hydrocarbons, primarily ethylene and ethane.

22 Claims, 3 Drawing Sheets

(51) Int. Cl.
H01M 8/12 (2006.01)
C25B 5/00 (2006.01)

(52) U.S. Cl.
CPC ........... *H01M 8/1253* (2013.01); *Y02E 60/521* (2013.01); *Y02E 60/525* (2013.01); *Y02E 60/566* (2013.01); *Y02P 70/56* (2015.11)

(56) References Cited

OTHER PUBLICATIONS

Hutchings et al., Oxidative Coupling of Methane using Oxide Catalysts, 1989, Chemical Society Reviews, 18, 251-283.*
Tagawa et al., Design of electrode for solid oxide fuel cells reactor, 1998, Solid State Ionics, 106, 227-235.*
Kamata et al., High temperature electrocatalytic properties of the SOFC air electrode La0.8Sr0.2MnO3 / YSZ, 1998, Solid State Ionics, 106, 237-245.*
Tagawa et al., Fuel Cell Type Reactor for Chemicals-Energy Co-generation, 1999, Chemical Engineering Science, 54, 1553-1557.*
Kuo et al., Low temperature synthesis of nanocrystalline lanthanum monoaluminate powders by chemical coprecipitation, 2007, Journal of Alloys and Compounds, 440, 367-374.*
Cordischi et al., LaAl1-xCrxO3 perovskite-type solid solutions: Structural, electronic, magnetic properties and catalytic activity towards CO oxidation, May 2002, Physical Chemistry Chemical Physics, 4, 3085-3090.*
Harada et al., Perovskite-type oxides as catalysts for selective reduction of nitric oxide by ethylene, 1997, Applied Surface Science, 121/122, 505-508.*
Fu, et al., "Evaluation of Sr- and Mn-substituted LaAlO3 as Potential SOFC Anode Materials." Solid State Ionics, vol. 177, p. 1059-1069, 2006.
Spinicci, et al., "Oxidative Coupling of Methane on LaAlO3 Perovskites Partially Substituted with Alkali or Alkali-Earth Ions." Journal of Molecular Catalysis A: Chemical, vol. 176, p. 253-265, 2001.
Tagawa, et al. "Selective Oxidation of Methane in SOFC-type Reactor: Effect of Applied Potential." Chemical Engineering Journal, vol. 93, p. 3-9, 2003.
Kiatkittipong et al., "Oxidative Coupling of Methane in the LSM/YSZ/LaAlO SOFC Reactor", Journal of Chemical Engineering of Japan, vol. 37, No. 12 (2004) pp. 1461-1470.
Tagawa et al., "Design of electrode for solid oxide fuel cells reactor", Solid State Ionics, vol. 106 (1998) pp. 227-235.
Baronetti et al., "Structure of Unpromoted and Alkali-Metal Promoted MnOx-Based Catalysts for Oxidative Coupling of Methane", Applied Catalysis, vol. 61 (1990) pp. 311-328.
Bartsch et al., "Investigations on a Ce/Li/MgO—Catalyst for the Oxidative Coupling of Methane", Catalysis Today, vol. 6 (1990) pp. 527-534.
Ito et al., "Synthesis of ethylene and ethane by partial oxidation of methane over lithium-doped magnesium oxide", Nature, vol. 314 (1985) pp. 721-722.
Kiatkittipong et al., "Oxidative Coupling of Methane in the LSM/YSZ/LaAlO SOFC Reactor", Journal of Chemical Engineering of Japan, vol. 37, No. 12 (2004) pp. 1461-1470.
Le Van et al., "Structure Sensitivity of the Catalytic Oxidative Coupling of Methane on Lanthanum Oxide", Catalysis Letters, vol. 6 (1990) pp. 395-400.
Lin et al., "Oxidative Dimerization of Methane over Sodium-Promoted Calcium Oxide", Journal of Catalysis, vol. 111 (1988) pp. 302-316.
Mirodatos et al., "The Nature, Role and Fate of Surface Active Sites in Li/MgO Oxidative Coupling Catalysts", Catalysis Today, vol. 4 (1989) pp. 301-310.
Otsuka et al., "Active and Selective Catalysts for the Synthesis of C2H4 and C2H6 via Oxidative Coupling of Methane", Journal of Catalysis, vol. 100 (1986) pp. 353-359.
Tagawa et al., "Design of electrode for solid oxide fuel cells reactor", Solid State Ionics, vol. 105 (1998) pp. 227-235.
Wang et al., "Low-temperature selective oxidation of methane to ethane and ethylene over BaCo3/La2/O3 catalysts prepared by urea combusion method", Catalysis Communications, vol. 7 (2006) pp. 59-63.

* cited by examiner

METHOD FOR THE PRODUCTION OF LIGHT HYDROCARBONS FROM GAS WITH HIGH METHANE CONTENT, A SOLID OXIDE FUEL CELL USED FOR THE PRODUCTION OF LIGHT HYDROCARBONS FROM GAS WITH HIGH METHANE CONTENT, AND A CATALYST FOR THE PRODUCTION OF LIGHT HYDROCARBONS FROM GAS WITH HIGH METHANE CONTENT

TECHNICAL FIELD

The present invention refers to the conversion of gaseous fuels with high methane content, such as natural gas, biogas, synthesis gas or gas obtained from various industrial process rejects, with or without prior desulfurization and elimination of other contaminants, in a solid oxide fuel cell (SOFC), with special anodes, based on mixed oxides or oxides of metals with perovskite structure, either or not nanostructured, into light hydrocarbons, primarily ethylene and ethane.

Oxidative Coupling Reaction of Methane

Presently, the conversion of methane into hydrocarbons of higher added value, such as $C_2$, may be achieved basically in two ways: directly, by means of coupling, or indirectly, whereby is formed an intermediate product in a first step, and wherefrom are produced other organic compounds.

The catalysts for oxidative chemical coupling studied in the literature may be divided into three categories:

1. Catalysts based on alkaline and alkaline earth metals;
2. Catalysts based on rare earth metals; and,
3. Catalysts based on transition and post-transition elements.

The catalysts based on alkaline earth metals are active for the oxidative coupling reaction of methane, however when promoted by appropriate metals, the conversion and the selectivity increase significantly. Lunsford et al., in "*Synthesis of ethylene and ethane by partial oxidation of methane over lithium-doped magnesium oxide*", Nature 314, 721-722, 1985, developed the systems Li/MgO and Na/CaO, for which the cationic radii of the dopant and of the host are very close, there occurring a substitution of the alkaline earth metal with the alkaline metal. The authors demonstrated that there occurs the formation of radicals of the type $[M^+O^-]$, that are the active sites of that reaction, there being thus achieved an increase in conversion and selectivity at 720 deg. C. and a favored formation of ethylene over ethane. However, this catalyst deactivates significantly due to the loss of Li by volatilization of the LiOH species as noted by Van. T. et. al., in "*Structure sensitivity of the catalytic oxidative coupling of methane on lanthanum oxide*", Catalysis Letters, V. 6, page 395, 1989. According to Mirodatos et. al., in "*The nature, role and fate of surface active sites in Li/MgO oxidative coupling catalysts*", Catalysis Today, V. 4, pages 301-310, 1989, the addition of silica avoids this volatilization, without altering the selectivity to $C_2$. Lunsford et. al., in "*Oxidative dimerization of methane over sodium promoted calcium oxide*", Journal of Catalysis, V. 111, pages 302-316, 1988, observed that the presence of $Na^+$ over CaO enhances the activity due to the formation of $Na^+O^-$ sites.

Morikawa A. et. al.; in "*Active and selective catalysts for the synthesis of $C_2H_4$ and $C_2H_6$ via oxidative coupling of methane*", Journal of Catalysis, V. 100, pages 353-359, 1986, report that catalysts based on rare earth metals in the form of $M_2O_3$ are active for this reaction, with the exception of cerium, praseodymium and terbium; the best catalytic results were achieved with lanthanum, samarium and neodymium. This activity is directly related to the basicity of the material, but it is not by itself sufficient to ensure a good performance, there being required active sites containing weak acids that aid the formation of methyl radicals, of the type $CH_3^+$, in gaseous phase, that afford a high level of conversion. The addition of alkaline earth metals enhances the selectivity in $C_2$. Baronetti et. al; in "*Structure of unpromoted and alkali-metal promoted MnOx-based catalysts for oxidative coupling of methane*", Applied Catalysis, V. 61, pages 311-328, 1990, added $CeO_2$ over Li/MgO and noted an improvement in reactivity and selectivity, thereby validating the mechanism proposed by Lunsford et al. in "*Synthesis of ethylene and ethane by partial oxidation of methane over lithium-doped magnesium oxide*", Nature 314, 721-722, 1985. According to these authors the methane is activated by sites of the type $[Li^+O^-]$, forming on one hand radicals $CH_3^+$, that generate $C_2H_6$, while on the other hand it is activated by sites $[Li^+HO^-]$, that generate water and compounds of the type $[Li^+e^-]$, which should be regenerated with the introduction of gaseous oxygen to return to the form $[Li^+O^-]$. Bartsch et al., in "*Investigations on a Ce/Li/MgO-Catalyst for the oxidative coupling of methane*", Catalysis Today, V. 6, pages 527-534S, 1989, proposed a mechanism whereby the cerium participates under the form of $Ce_3^+$ and $Ce_4^+$ and acts as a promoter in the transport of charge.

There were further studied transition and post-transition elements; however the same pose serious problems of stability. Jiaxin Wang et al., in "*Low-temperature selective oxidation of methane to ethane and ethylene over $BaCO_3/La_2O_3$ catalysts prepared by urea combustion method*", Catalysis Communication, V. 7, pages 59-63, 2006, while studying the oxidative chemical coupling of the methane using 5% $BaCO_3/La_2O_3$ as catalyst, obtained 31.8% conversion and 45.9% selectivity for $C_2$ at 320° C. The authors observed that the increase in the content of $BaCO_3$ favored the formation of $C_2$.

In the literature there is found data reporting that the total selectivity to $C_2$ diminishes with the increase in conversion of methane and only few catalysts are able to achieve selectivity to $C_2$ above 80%, with a methane conversion of more than 15%. Thus, the yield values obtained for $C_2$ are, in general, less than 30%.

THE PRESENT INVENTION

The main challenge to render the process of chemical oxidative coupling of methane commercially viable consists in the fact where higher yield of the product is achieved. Thus, complementing the question, it has been decided to research alternative reactors with the purpose of overcoming the limitation of low selectivity in high conversion of methane. There was made an option for the use of electrochemical systems of the type of solid oxide fuel cell—SOFC The SOFCs are comprised by small-power unit cells. These groups, in turn, can also be connected in series or in parallel, to increase the installed power or the current generated. This characteristic lends great flexibility in terms of power scaling, easy maintenance of fuel cells and increased selectivity with high conversion of methane.

To that end, there were initially tested compounds with chemical catalytic capability to then design electro-catalysts for use in SOFCs. The mechanisms associated with each of the mentioned conversion types are cited below.

There are specified the following fundamental chemical catalytic reactions for oxidative coupling of methane:

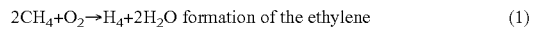  $2CH_4+O_2 \rightarrow H_4+2H_2O$  formation of the ethylene  (1)

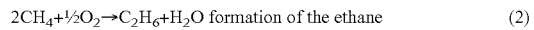  $2CH_4+\frac{1}{2}O_2 \rightarrow C_2H_6+H_2O$  formation of the ethane  (2)

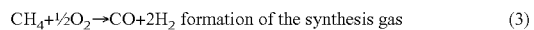  $CH_4+\frac{1}{2}O_2 \rightarrow CO+2H_2$  formation of the synthesis gas  (3)

  $CH_4+2O_2 \rightarrow CO_2+2H_2O$  (4)

It is known that, in addition to these, there are also other intermediate reactions not mentioned herein. The purpose of the chemical catalytic oxidative coupling of methane to $C_2$ consists in prioritizing the equations (1) and (2). Frequently the dehydrogenation of the ethane is catalyzed to produce ethylene. This type of coupling involves two basic mechanisms, which require the presence of catalytic elements for each of them, acting with:

1. Catalytic activity on the $CH_4$, producing an activated complex of the $CH_4$ which: a) facilitates the conversion thereof into $CH_3^+$, releasing a hydrogen, to allow the reaction of two $CH_3^+$ for forming $C_2H_6$ or b) facilitates the conversion thereof into $CH_2^{++}$, releasing two hydrogen, to allow the reaction of two $CH_2^{++}$ for forming the $C_2H_4$. The hydrogen thus released will serve to produce water or $H_2$; c) facilitates the conversion thereof into carbons and hydrogen, available for the formation of CO, $CO_2$ and $H_2$;

2. Catalytic activity on the $O_2$ for generating $O^=$, which will react with two hydrogen, originated from the production of $CH_3^+$ or $CH_2^{++}$ from the $CH_4$, to produce water.

Analogously, there are specified the following fundamental electro-catalytic, reactions for the electrochemical conversion of the methane in a SOFC:

a) Anodic reactions of partial oxidation of the methane:

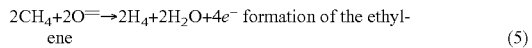

$$2CH_4 + 2O^= \rightarrow 2H_4 + 2H_2O + 4e^-  \text{ formation of the ethylene} \quad (5)$$

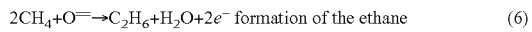

$$2CH_4 + O^= \rightarrow C_2H_6 + H_2O + 2e^-  \text{ formation of the ethane} \quad (6)$$

$$CH_4 + 3O^= \rightarrow CO + 2H_2O + 6e^- \quad (7)$$

b) Cathodic reaction:

$$2O_2 + 8e^- \rightarrow 4O^= \quad (8)$$

It is known that other intermediate reactions may eventually be present and that the total oxidation reaction, which is desired when the main purpose is the generation of electricity with the SOFC, is:

$$CH_4 + 4O^= \rightarrow 2H_2O + CO_2 + 8e^- \quad (9)$$

It is sought to give preference to reactions (5) and (6) for the purpose of using a SOFC as an electrochemical reactor for the production of $C_2$ from methane.

The intended electro-catalytic oxidative electrochemical coupling of the methane in a SOFC with a zirconia-stabilized yttria electrolyte, which is a conductor for $O^=$ ions, involves two basic mechanisms, that are processed separately in the cathode and in the anode of the fuel cell:

1. The catalytic reaction of the oxygen in the cathode, producing $O^=$ ions, that are absorbed by the electrolyte and proceed to cross the same by diffusion in solid state in the direction of the anode;

2. Arrival of the $O^=$ ions at the anode, by solid state diffusion across the electrolyte, in order to promote the reaction of partial (or total) oxidation of the methane in the anode, releasing electrons that follow an external path to reach the cathode, continuing the production of $O^=$ ions in the cathode and the consequent formation of water in the anode;

It is important to point out that the chemical catalytic oxidative coupling of methane requires the existence of a catalytic element for the production of $O^=$, while this ion is already present in the fuel cell by the reaction that takes place in the cathode, which is supplied to the anode by means of the electrolyte.

The main difficulty in obtaining the direct conversion of the $CH_4$ into larger hydrocarbons consists in the need to have temperatures either equal to or higher than 700 deg. C., which imposes a limitation on the type of material used in electrochemical reactors. In this context, solid oxide fuel cells (SOFCs) have adequate properties to work in systems under high temperatures.

The principle of operation of the SOFCs is based in the physical separation of the reactions of oxidation of the methane and of reduction of the oxygen in tight compartments, containing catalysts appropriate for each type of electrochemical reaction, simultaneously with the provision of the means (electronic and ionic interconnections, in the form of current collectors and electrolytes, respectively), in order that the electrochemical reaction of oxy-reduction be processed under controlled conditions, that is, generating electrical energy by an external circuit.

The SOFC is composed of two porous electrodes, anode and cathode, separated by an electrolyte. The oxygen, typically originating from the air, is adsorbed on the cathode surface, which function consists in catalyzing the electrochemical reactions for the oxygen reduction. Therefore, the reactive species are no longer molecules of oxygen in gaseous phase and become oxygen ions, that are directly supplied to the catalytic sites of the anode through a ceramic membrane of yttria-stabilized zirconia (YSZ), which is dense, impermeable to gas, and conductor of these $O^=$ ions. In the anode there occur electro-catalytic reactions of coupling of methane with the $O^=$ ions originating from the electrolyte.

In SOFC systems, a part of this free energy may be transformed into electrical energy. The control of reactivity and penetration of the oxygen species by the catalytic electrode may further limit the formation of $CO_2$ during the reaction surface.

In addition to these advantages, whereby the reactivity and the selectivity of the oxygen ions may be modulated by means of the application of an external potential, an effect known as NEMCA (English acronym for "Non Faradaic Eletrochemical Modification of Catalytic Activity"), which modifies the work function of an electrochemical catalyst by means of the imposition of an external potential, consequently modulating its reactivity and selectivity.

Ozum et al., in "*Fuel cells composed of bifunctional catalyst anodes and proton conducting membranes for direct utilization of natural gas*", Canadian Patent No. CA 2,186,786 of October of 1996, reported the use of an electrolyte fuel cell with a proton conductor membrane for the methane coupling reaction and energy co-generation. However, the authors did neither specify the materials involved nor the performance of the suggested system, either regarding the production of hydrocarbons $C_2$ or of longer carbon chain relatively to the generation of energy.

The literature shows that lanthanum oxides are active and selective catalysts for the coupling of methane. This has raised interest in the field of study of oxides with perovskite-type crystalline structure. These oxides are characterized by the high mobility of the electrons and ions of oxygen, that promote a reaction that is adequate for the coupling of the methane. Furthermore, in order to meet the above mentioned requirements, the rare earth metal oxides are being studied due to their ability to activate the oxygen and their high electro-catalytic activity for the electrochemical oxidative coupling of methane. This suggests that a catalyst containing lanthanum, for example, ($LaAlO_3$), is active and the oxygen species are able to move at the operating temperature of the SOFC.

The oxides having perovskite-type structures have the general formula $ABO_3$ and the composition thereof can be changed by substituting the cations in both sites A and B with other metals with different oxidation states. In this case, the formation of structural defects, such as anionic or cationic lacunae, increases in order to maintain the electrical neutrality of the compound. For example, the substitution with $A3^+$ and/or $B3^+$ cations by a preferentially more stable metal, with a state of oxidation of less than +3, achieves the compensation of the charge. This occurrence interferes with the redox property of the catalyst.

The compound $LaAlO_3$ (wherein $La_3^+$ and $Al_3^+$ occupy the sites A and B, respectively), with perovskite structure, contain a limited oxygen species, and thereby appears as an appropriate electro-catalyst for the electrochemical oxidative coupling reaction of the methane.

Kiatkittipong, et al., in "*Oxidative Coupling of Methane in the LSM/YSZ/LaAlO$_3$ SOFC Reactor*", Journal of Chemical Engineering, vol 37, pages 1461-1470, 2004, demonstrated that there have been proposed various alternatives for the utilization of the intrinsic perovskite $LaAlO_3$, in a SOFC reactor, for the purpose of obtaining a high rate of conversion of methane and selectivity to $C_2$ without reducing the capacity of electrical energy generation. However, the authors failed to report electronic conductivity and yield values in connection with a sufficient conversion of methane to afford a good performance of the SOFC.

Therefore, it is an object of the present invention to provide a process for the production of light hydrocarbons from methane-rich gas using solid oxide fuel cells, characterized by the fact of there being used a solid oxide fuel cell comprised a nanostructured or not nanostructured anode with a chemical composition based on lanthanum aluminate ($LaAl_{1-x}M_xO_3$), wherein M corresponds to a chemical element from among transition elements such as Mn, Cr, Ti, V, Co, Cu; and x represents approximately a content in the range of 0 to 50% in mol; the cell being supplied with gaseous fuels rich in methane for co-production of electrical energy and light hydrocarbons, rich in the fraction $C_2$.

In a preferred embodiment of the process, the gaseous or gasifiable fuels rich in methane fed to the cell are selected from among natural gas, biogas, synthesis gas and gas derived from various industrial process rejects.

In another preferred embodiment of the process, the $C_2$ hydrocarbons produced are ethylene and ethane.

In another preferred embodiment of the process, there are produced hydrocarbons from the $C_3$ fraction.

In another preferred embodiment of the process, the cell is operated at a temperature in the range of 600 to 1000 deg. C.

In another preferred embodiment of the process, the electrical energy is generated simultaneously by means of electrochemical conversion of chemical energy into electrical energy with a high degree of efficiency during the selective oxidation.

In another preferred embodiment of the process, the cell is operated with variable combustible/oxidizing gas outflow rates (0.5:1 to 3:1 and 2:1 to 1:3).

In another preferred embodiment of the process, the cell is operated with preheated fuel.

In another preferred embodiment of the process, the cell is operated with fuel at ambient temperature.

It is also an object of the present invention to provide a solid oxide fuel cell used for the production of light hydrocarbons from methane-rich gas, characterized by comprising a nanostructured or non-nanostructured anode with a chemical composition based on lanthanum aluminate ($LaAl_{1-x}M_xO_3$), wherein M corresponds to a chemical element from among transition elements such as Mn, Cr, Ti, V, Co, Cu and x represents approximately a content in the range of 0 to 50% in mol.

In a preferred embodiment of the cell, the cathode thereof exhibits a composition of $La_{0.8}Sr_{0.2}MnO_3$ and operated with oxidizers selected from among $O_2$ obtained from the air, pure $O_2$ or other gas mixtures rich in $O_2$ and its electrolyte is YSZ (yttria-stabilized zirconia).

In a preferred embodiment of the cell, the same exhibits at least one of the configurations: supported by the electrolyte, by the anode or by the cathode.

In a preferred embodiment of the cell, the electrolyte is a conductor of ions of oxygen $O^{2-}$ or of protons, $H^+$.

In a preferred embodiment of the cell, not supported by the electrolyte, the electrolyte is present in the form of thin films and the cell is operated at temperatures of 500 to 800 deg. C.

In a preferred embodiment of the cell, the electrolyte is present under support of the electrodes or of a layer deposited on the supporting electrode, and the cell is operated at temperatures of 700 to 1000 deg. C.

In a preferred embodiment of the cell, the anode exhibits electrochemical and electro-catalytic activity with selectivity for $C_2$ hydrocarbons and resistance to the deposition of carbon.

It is also an object of the present invention to provide a catalyst for the production of light hydrocarbons from methane-rich gas used in anodes of solid oxide fuel cells, characterized by being comprised of mixed oxides based on aluminum and lanthanum ($LaAl_{1-x}M_xO_3$) wherein M corresponds to a chemical element from among transition elements such as Mn, Cr, Ti, V, Co, Cu; and x represents approximately a content in the range of 0 to 50% in mol, is active and selective in the electrochemical oxidative coupling of the methane and exhibits a structure that is preferably a perovskite type structure.

In a preferred embodiment of the catalyst, the same exhibits thermal stability in the range of up to 1200 deg. C.

In a preferred embodiment of the catalyst, the same is synthesized with molar concentrations of La:Al varying in the range of 1:1 to 2:3.

In a preferred embodiment of the catalyst, the same exhibits, simultaneously, catalytic and electro-catalytic functions for the chemical and electrochemical conversion of the $CH_4$ into light hydrocarbons rich in $C_2$.

In a preferred embodiment of the catalyst, the same exhibits an average particle diameter of submicrometric or nanometric size and with an approximately monomodal particle size distribution, which enables the preparation of ceramic suspensions for films or layers of micrometric, submicrometric or even nanometric thickness.

BRIEF DESCRIPTION OF THE DRAWINGS

FIG. 2(*b*) is a scanning electronic microscope image performed on the surface of the anode at an increment of 5000 times.

DETAILED DESCRIPTION OF THE INVENTION

Figure 1:
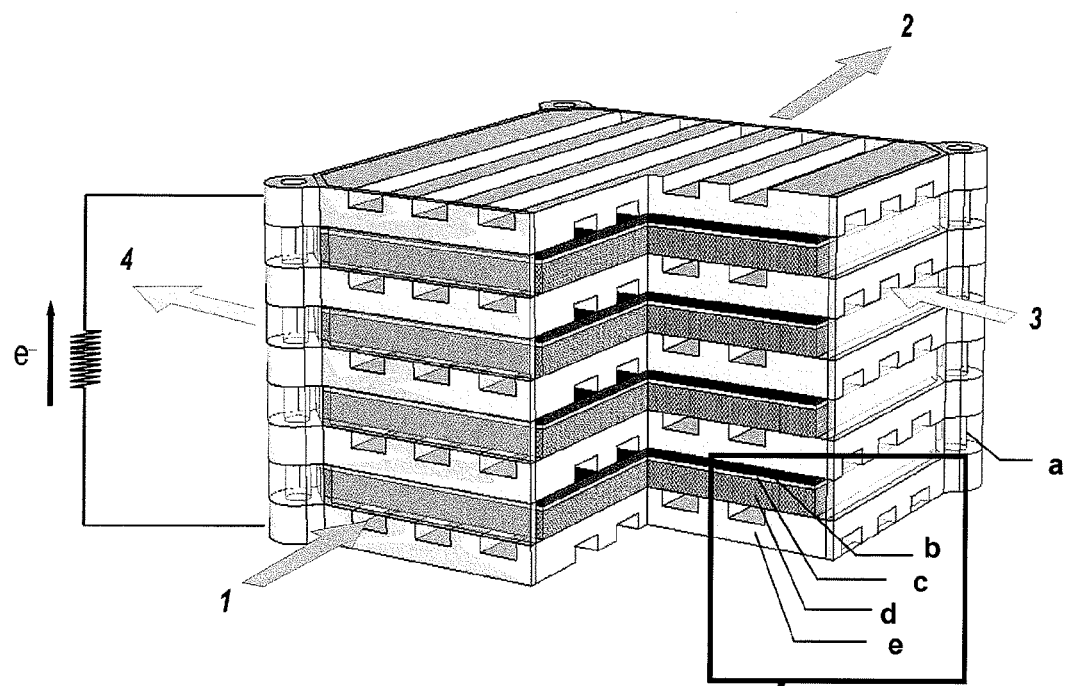
FIG. 1 depicts a SOFC type electrochemical reactor.
Figure 1:
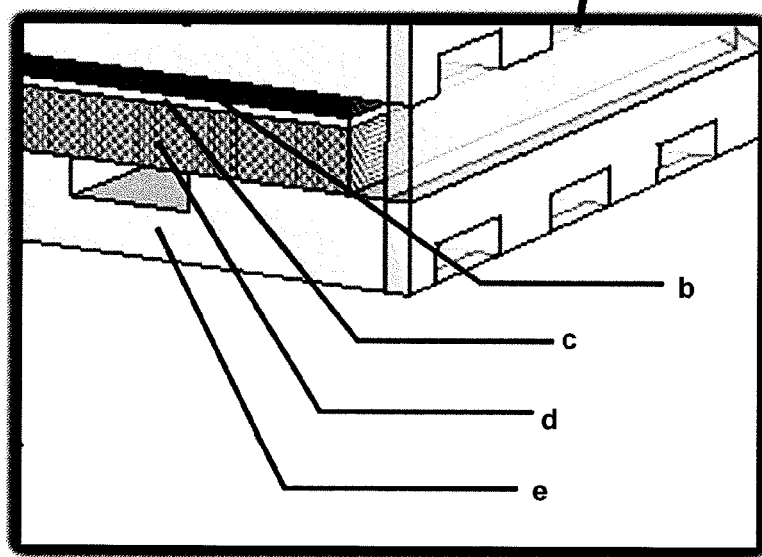

The present invention describes the use of methane-rich gaseous or gasifiable fuels, of the type of natural gas, biogas, synthesis gas and gas arising from various industrial process rejects, with or without prior desulfurization and elimination of other contaminants, in a reactor of the solid oxide fuel cell—SOFC—type, having anodes with special characteristics, based on mixed oxides or metal oxides of perovskite-type structure, either or not nanostructured, for the production of light hydrocarbons, rich in the $C_2$ fraction.

For this purpose, there were developed anodes based on lanthanum aluminates ($LaAl_{1-x}M_xO_3$) wherein M corresponds to transition elements such as Mn, Cr, Ti, V, Co, Cu; and, x represents approximately a content in the range of 0 to 50% in mol. The substitution of the $LaAlO_3$ with high quantities of M elements (≥35 mol %) in site B, improves the electronic conductivity, making the same a potential candidate for an anode, for the co-generation of $C_2$ hydrocarbons, due to the charge compensation.

There are described below some experimental procedures as examples of the methodology that was used for obtaining catalysts with perovskite structure and manufacture of functional anodes for SOFCs in order to provide the electrocatalytic conversion of the methane into $C_2$ hydrocarbons.

The catalysts with perovskite-type crystalline structure were obtained from the decomposition of the amorphous citrate. As precursors, there were used nitrate-based solutions. Initially, there was prepared an aqueous solution that was heated, under magnetic stirring, until there was observed the formation of a very viscous system. Thereafter the citrate was dried in an oven, was pre-calcined, and was subsequently subjected to calcination.

The ceramic suspensions for the anodes manufacture were prepared from the precursor powder mixture, of a pore former agent (for example, corn starch) and a dispersant, in order to obtain a suspension both viscous and satisfactorily homogeneous, with a high solid content. Such mixture was made up in a planetary ball mill grinder (RETSCH PM100) by means of consecutive grinding, with an YSZ grinding body. The same procedure was adopted for the preparation of the cathode, using as a precursor material the $La_{0.8}Sr_{0.2}MnO_3$.

In the preparation of a unitary SOFC the anodic suspension is deposited on one side of the electrolyte of YSZ (zirconia stabilized with 8 mol % of yttria). After the deposition, there is performed a thermal sintering treatment with stages and heating and cooling rates in accordance with each specific catalytic material. Using the other face of the electrolyte, there is started the production of the cathode, by depositing a lanthanum manganite-based cathodic ceramic suspension, followed by sintering, thereby composing the conjugate electrodes/electrolyte of a unitary SOFC. For the collection of current, during the performance test, there are welded gold wires to the cathode and platinum wires to the anode.

A SOFC type electrochemical reactor was designed, shown in FIG. 1, in such a way that fuel is fed in the position indicated by the reference character (1); fuel is eliminated in the position indicated by reference character (2); oxidizer is fed in the position indicated by the reference character (3) and oxidizer is eliminated in the position indicated b the reference character (4), for controlling the conversion of the methane-rich gas into products that are eliminated from the fuel cell through the same position (2) with which non-reacted fuel is also eliminated from the fuel cell, with high selectivity to $C_2$ hydrocarbons. The assembly of a test bench consists in the feeding of the SOFC with fuel and oxidizer, with warranted gas-tightness, which is provided by means of sealing of the unitary cells with vitreous-ceramic sealing material (a), with the current being collected by means of nickel wires adapted to the cathode (b) and to the anode (d), which are interposed by the electrolyte (c). The unitary cells in a stacked arrangement are separated by interconnecting materials (e), also named bipolar plates, that guide the leak-tight passage of the fuel and of the oxidizer through the stack and collect the electrical current produced in the fuel cell.

The entire test bench for the electrochemical performance of a SOFC was structured. It provides a reactor that may operate at up to 1200 deg. C.; piping and distribution of gas; flow controllers, a gas chromatography apparatus, operating on line with the reactor; a potentiostat/galvanostat; a digital multimeter used to measure the electrical current and a sequence of resistive charges, varying, for example, in the range of 1.2Ω to 10.26 MΩ.

EXAMPLES

Example 1

This example demonstrates the influence of the manufacturing process on the microstructure of the anode. In the anode based on lanthanum aluminate, $LaAl1-xMxO3$, wherein M corresponds to a chemical element from among transition elements such as Mn, Cr, Ti, V, Co, Cu; and, x represents approximately a content in the range of 0 to 50% in mol.

Figure 2:
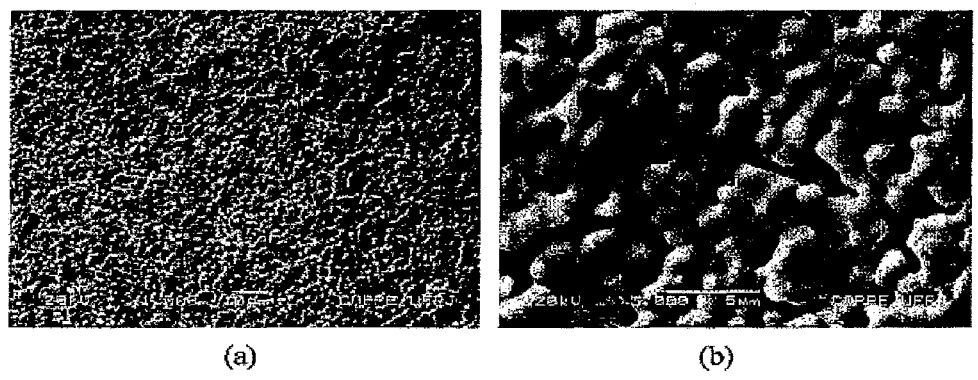
FIG. 2(*a*) is a scanning electronic microscope image performed on the surface of the anode at an increment of 1000 times.

In the anode of a solid oxide fuel cell, the porosity is important for the supply of fuel through the pores at triple phase boundary wherein the reaction occurs. In FIG. 2, there may be observed, by means of scanning electronic microscopy analysis performed on the surface of the anode in increments of (a) 1000 and (b) 5000 times, that the surface is quite homogeneous and that the pore former agent, corn starch, proved efficient in the formation of pores, since both microstructures (a) and (b) evidence a uniform distribution of pores and interconnectivity among the same. This aids the diffusion of the gas until the triple phase boundary (gas/electrode/electrolyte). A morphological analysis evidenced that the surface of the anode appears homogeneous and devoid of cracking.

Example 2

Figure 3:
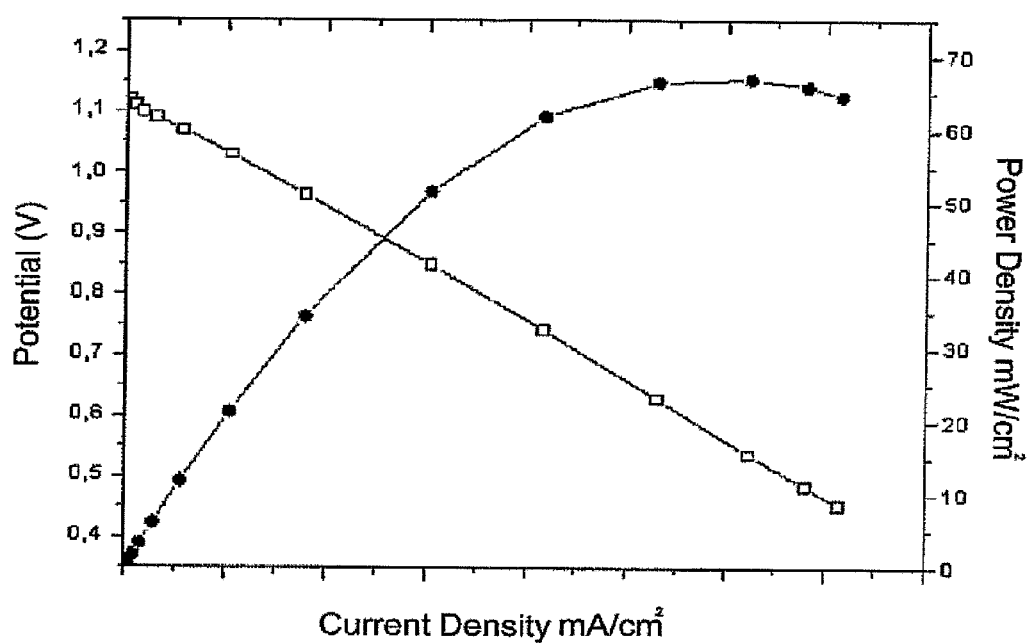
FIG. 3 is a graph showing the potential value in open circuit equal to 1.2 V and the maximum power and current densities.

In the electrochemical performance test conducted with the SOFC of $La_{0.8}Sr_{0.2}MnO_3/YSZ/LaAl_{1-x}M_xO_3$ (wherein M corresponds to a chemical element from among transition elements such as Mn, Cr, Ti, V, Co, Cu; and, x represents approximately a content in the range of 0 to 50% in mol), the unitary cell with electrolyte of 200 μm, evidenced efficiency in the generation of electrical energy. In FIG. 3 there is shown the potential value in open circuit equal to 1.2 V and the maximum power and current densities. This result is quite significant having in view the data of open circuit potential between 1.02 and 1.08 V, obtained by Kiatkittipong et al., in "*Oxidative coupling of methane in the LSM/YSZ/LaAlO SOFC reactor*", Journal of Chemical Engineering of Japan, vol. 37, No. 12, pages 1461-1470, 2004, in a system of oxygen/$La_{0.85}Sr_{0.15}MnO_3$/8 mol % $Y_2O_3$—$Zr_{O2}$/$La_{1.8}Al_{0.2}O_3$/methane.

Based on the results obtained experimentally it is concluded that the unitary SOFC developed in this study is able to convert the energy of partial oxidation directly to electrical energy, when operated with gaseous or gasifiable fuels rich in methane (and not hydrogen).

Example 3

There was conducted a chromatographic analysis of the products of the electrochemical reaction conducted when the reactor is operated with the SOFC with a composition of $La_{0.8}Sr_{0.2}MnO_3/YSZ/LaAl_{1-x}M_xO_3$ (wherein M corresponds to a chemical element from among transition elements such as Mn, Cr, Ti, V, Co, Cu; and x represents approximately a content in the range of 0 to 50% in mol), and fed with ratios of fuel/oxidizer varying in the range of 1/2 to 3/1 and 2/1 to 1/3. In these operational conditions, the unitary cell evidenced the conversion of gaseous or gasifiable fuels rich in methane and selectivity into light hydrocarbons, primarily ethylene and ethane, in the range of 4 to 30% and 100 to 60%, respectively. According to the data, it is observed that the SOFC evidences a significant efficiency in terms of conversion, selectivity, generation of electrical energy and heat. Kiatkittipong et al., in "*Oxidative coupling of methane in the LSM/YSZ/LaAlO SOFC reactor*", Journal of Chemical Engineering of Japan, vol. 37, No. 12, pages 1461-1470, 2004, studied the oxidative coupling of the methane in a SOFC reactor, using oxygen/$La_{0.85}Sr_{0.15}MnO_3$/8 mol % $Y_2O_3$—$ZrO_2$/$La_{1.8}Al_{0.2}O_3$/methane, and achieved conversion and selectivity in $C_2$ of 23.7% and 91.7%, respectively, at 1000 deg. C. On the other hand, Tagawa et al., in "*Design of electrode for solid oxide fuel cells reactor*", Solid State Ionics 106, pages 227-235, 1998, on researching the oxidative coupling of the methane in a SOFC reactor using air/$La_{0.85}Sr_{0.15}MnO_3$/8 mol % $Y_2O_3$—$ZrO_2$/$La_{1.8}Al_{0.2}O_3$/methane observed conversion and selectivity of the order of 4.01% and 96.5% respectively. Upon comparing the data from the literature with the results obtained experimentally, it is observed that the values obtained in the tests having been conducted have the same order of magnitude when the reactor is operated with LSM/YSZ/$LaAlO_3$, however the appropriate substitutions in the octaedric site B of the perovskite $ABO_3$ enhance the reactivity and selectivity of $C_2$ hydrocarbons from 10 to 15% when compared with $LaAlO_3$, due to the high compensation of charge, considering that for this intrinsic oxide there was achieved a satisfactorily good result

The invention claimed is:

1. A solid oxide fuel cell containing a cathode, an anode and an electrolyte comprising:
a nanostructured or non-nanostructured anode with a chemical composition based on lanthanum aluminate ($LaAl_{1-x}M_xO_3$), wherein M corresponds to a chemical element from among transition elements selected from the group consisting of Mn, Cr, Ti, V, Co, Cu and x represents approximately a content in the range of 35 to 50% in mol.

2. A solid oxide fuel cell as claimed in claim 1, characterized in that the cathode thereof exhibits a composition of $La_{0.8}Sr_{0.2}MnO_3$ and operates with oxidizers selected from among $O_2$ obtained from air, pure $O_2$ or other mixtures of gas with $O_2$ and the electrolyte thereof is YSZ (yttria-stabilized zirconia).

3. A solid oxide fuel cell, as claimed in claim 1, characterized by exhibiting at least one of the following configurations: supported by the electrolyte, by the anode or by the cathode.

4. A solid oxide fuel cell as claimed in claim 1, characterized in that the electrolyte is a conductor of $O^{2-}$ oxygen ions or $H^+$ protons.

5. A solid oxide fuel cell, as claimed in claims 1, not supported by the electrolyte, characterized in that the electrolyte is provided in the form of films micrometric, submicrometric or nanometric thickness, and with the fuel cell being operated at temperatures of 600 to 800° C.

6. A solid oxide fuel cell as claimed in claims 1,
characterized in that the electrolyte is provided on a support constituted by the anode and the cathode or a layer deposited on the anode or the cathode and in that the cell is operated at temperatures of 700 to 1000° C.,
wherein the anode is a supporting anode or the cathode is a supporting cathode.

7. A solid oxide fuel cell, as claimed in claims 1, characterized in that the anode evidences electrochemical and electro-catalytic activity with selectivity to $C_2$ hydrocarbons and resistance to a deposition of carbon.

8. A method for the production of light hydrocarbons from gas with methane content comprising:
supplying a solid oxide fuel cell (SOFC) with methane gaseous or gasifiable fuels; and
converting the methane gaseous or gasifiable fuels in the solid oxide fuel cell into light hydrocarbons, characterized by the solid oxide fuel cell comprising a nanostructured or non-nanostructured anode with a chemical composition based on lanthanum aluminate ($LaAl_{1-x}M_xO_3$), wherein M corresponds to a chemical element from among transition elements selected from the group consisting of Mn, Cr, Ti, V, Co, Cu; and x represents approximately a content in the range of 35 to 50% in mol, and wherein the methane gaseous or gasifiable fuels have a methane content sufficient to be converted into primarily ethylene and ethane with a conversion rate in the range of 4 to 30% and with a selectivity to C2 hydrocarbons in the range of 100 to 60%.

9. A method, as claimed in claim 8, characterized in that the methane gaseous or gasifiable fuels supplied to the cell are selected from among natural gas, biogasses, synthesis gasses and gasses arising from various industrial process rejects.

10. A method, as claimed in claim 8, characterized in that said light hydrocarbons are of the $C_2$ fraction.

11. A method, as claimed in claim 8, characterized in that the fuel cell is operated at a temperature in the range of 600 to 1000° C.

12. A method, as claimed in claim 8, characterized in that an electrical energy is generated simultaneously by means of an electrochemical conversion of chemical energy to electrical energy during a selective oxidation.

13. A method, as claimed in claim 8, characterized in that the fuel cell is fed with ratios of variable fuel/oxidizer gas flow rates of 0.33 to 3 parts of fuel to 1 part of oxidizer.

14. A method, as claimed in claim 8, wherein the methane gaseous or gasifiable fuels are preheated before entering the fuel cell.

15. A method, as claimed in claim 8, wherein the methane gaseous or gasifiable fuels are kept at ambient temperature before entering the fuel cell.

16. A method, as claimed in claim 8, characterized in that the SOFC is prepared by an anodic suspension deposited on one side of a zirconia-based electrolyte.

17. A method, as claimed in claim 16, further comprising performing a thermal sintering treatment after the anodic suspension is deposited on the one side of the zirconia-based electrolyte.

18. A catalyst for the production of light hydrocarbons from gasses with methane content, comprising:
mixed oxides based on aluminum and lanthanum ($LaAl_{1-x}M_xO_3$), wherein M corresponds to a chemical element from among transition elements selected from the group consisting of Ti, V, Co, Cu; and x represents approximately a content in the range of 35 to 50% in mol, active and selective in the electrochemical oxidative coupling of methane, and evidencing a structure that is of the perovskite type.

19. A catalyst, as claimed in claim 18, characterized in that the catalyst is synthesized with molar concentrations of La:Al varying within the range of 1:1 to 2:3.

20. A catalyst, as claimed in claim 18, characterized by having an average particle diameter of submicrometric or nanometric size and an approximately monomodal size distribution, enabling a preparation of ceramic suspensions for films or layers of micrometric, submicrometric or even nanometric thickness.

21. A catalyst, as claimed in claim 18, characterized by evidencing thermal stability in the range of up to 1200° C.

22. A catalyst, as claimed in claim 21, characterized by evidencing, simultaneously, catalytic and electro-catalytic functions in a chemical and electrochemical conversion of $CH_4$ into $C_2$ hydrocarbons.

* * * * *